(12) United States Patent
Ito et al.

(10) Patent No.: US 11,094,336 B2
(45) Date of Patent: Aug. 17, 2021

(54) SOUND ANALYSIS APPARATUS, SOUND ANALYSIS METHOD, AND NON-TRANSITORY COMPUTER READABLE STORAGE MEDIUM

(71) Applicant: Yokogawa Electric Corporation, Tokyo (JP)

(72) Inventors: Yuko Ito, Tokyo (JP); Hiroki Yoshino, Tokyo (JP)

(73) Assignee: Yokogawa Electric Corporation, Tokyo (JP)

(\*) Notice: Subject to any disclaimer, the term of this patent is extended or adjusted under 35 U.S.C. 154(b) by 0 days.

(21) Appl. No.: 16/541,748

(22) Filed: Aug. 15, 2019

(65) Prior Publication Data
US 2020/0075037 A1    Mar. 5, 2020

(30) Foreign Application Priority Data
Aug. 28, 2018    (JP) ................ JP2018-159075

(51) Int. Cl.
*G10L 25/51*    (2013.01)

(52) U.S. Cl.
CPC .................... *G10L 25/51* (2013.01)

(58) Field of Classification Search
CPC ..................................... G10L 25/51
See application file for complete search history.

(56) References Cited

U.S. PATENT DOCUMENTS

| 2003/0055639 | A1* | 3/2003 | Rees ................. G10L 15/04 704/233 |
| 2007/0183604 | A1 | 8/2007 | Araki et al. |
| 2016/0267908 | A1 | 9/2016 | Borjeson et al. |
| 2018/0277144 | A1* | 9/2018 | Nariyama ............ G10L 25/21 |

FOREIGN PATENT DOCUMENTS

| DE | 10250273 A1 | 5/2004 |
| JP | 9-6391 A | 1/1997 |

OTHER PUBLICATIONS

English machine translation of DE10250273 (Brensing et al., Acoustic examination apparatus for cardiac space of patient with prosthetic cardiac valve, is accommodated in portable hand-held device which can be operated by patient; published May 2004) (Year: 2004).*

\* cited by examiner

*Primary Examiner* — Mark Fischer
(74) *Attorney, Agent, or Firm* — Sughrue Mion, PLLC

(57) ABSTRACT

A sound analysis apparatus includes a sound acquirer configured to acquire a sound signal, a measurer configured to output time-series data of numerical values representing volumes based on the sound signal, and a calculator configured to perform calculation for analyzing the time-series data output from the measurer, wherein the calculator performs the calculation in a case of a first state in which a measured value that is the numerical value output from the measurer is included within an analysis target range that is a range in which the measured value is determined to be an analysis target, and wherein the calculator does not perform the calculation in a case of a second state in which the measured value is not included within the analysis target range.

8 Claims, 9 Drawing Sheets

SOUND ANALYSIS APPARATUS, SOUND ANALYSIS METHOD, AND NON-TRANSITORY COMPUTER READABLE STORAGE MEDIUM

BACKGROUND

Technical Fields

The present invention relates to a sound analysis apparatus, a sound analysis method, and a non-transitory computer readable storage medium.

Priority is claimed on Japanese Patent Application No. 2018-159075, filed on Aug. 28, 2018, the contents of which are incorporated herein by reference.

Related Art

A sound analysis apparatus uses a technique of analyzing a situation in which a sound is output by analyzing the sound. The sound analysis apparatus serves as a monitoring apparatus that investigates the cause of an abnormality in a surrounding environment by acquiring a sound in the surrounding environment and performing frequency analysis of the sound, as an example.

An example of a configuration of a sound analysis apparatus is as follows. A microphone connected to a sound analysis apparatus acquires a sound from a sound source that is a measurement target. A measurer provided in the sound analysis apparatus measures the volume of the acquired sound. The measurer outputs a time series of numerical values of volume levels.

A calculator performs analysis processing on data of the time series of numerical values. Specifically, the calculator performs processing such as a Fourier transform and analyzes a volume for each frequency band included in the acquired sound. That is, the calculator performs frequency analysis processing. Volume data output from the measurer and frequency analysis result data output from the calculator are output from an output device to the outside of the sound analysis apparatus.

Japanese Unexamined Patent Application Publication No. 09-006391 discloses an apparatus that performs frequency analysis processing based on an input signal in which an estimated source signal and a noise overlap and estimates the estimated source signal based on frequency analysis results.

Such a sound analysis apparatus had a problem of high power consumption because there were cases in which the sound analysis apparatus was operated full time and a large amount of calculations was required in a calculator. In addition, there were also cases in which a user started operation of the sound analysis apparatus when occurrence of an abnormality was detected, and thus there was a problem that frequency analysis of a sound was not performed immediately after occurrence of an abnormality because a delay occurred between occurrence of the abnormality and the user operation.

SUMMARY

A sound analysis apparatus may include a sound acquirer configured to acquire a sound signal, a measurer configured to output time-series data of numerical values representing volumes based on the sound signal, and a calculator configured to perform calculation for analyzing the time-series data output from the measurer, wherein the calculator performs the calculation in a case of a first state in which a measured value that is the numerical value output from the measurer is included within an analysis target range that is a range in which the measured value is determined to be an analysis target, and wherein the calculator does not perform the calculation in a case of a second state in which the measured value is not included within the analysis target range.

Further features and aspects of the present disclosure will become apparent from the following detailed description of exemplary embodiments with reference to the attached drawings.

DETAILED DESCRIPTION OF THE EMBODIMENTS

The embodiments of the present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

An aspect of the present invention is to provide a sound analysis apparatus, a sound analysis method, and a non-transitory computer readable storage medium which can analyze a sound while minimizing power consumption or can accurately perform sound analysis in a necessary period such as an abnormal case.

Next, a plurality of embodiments of the present invention will be described with reference to the drawings.

First Embodiment

Figure 1:
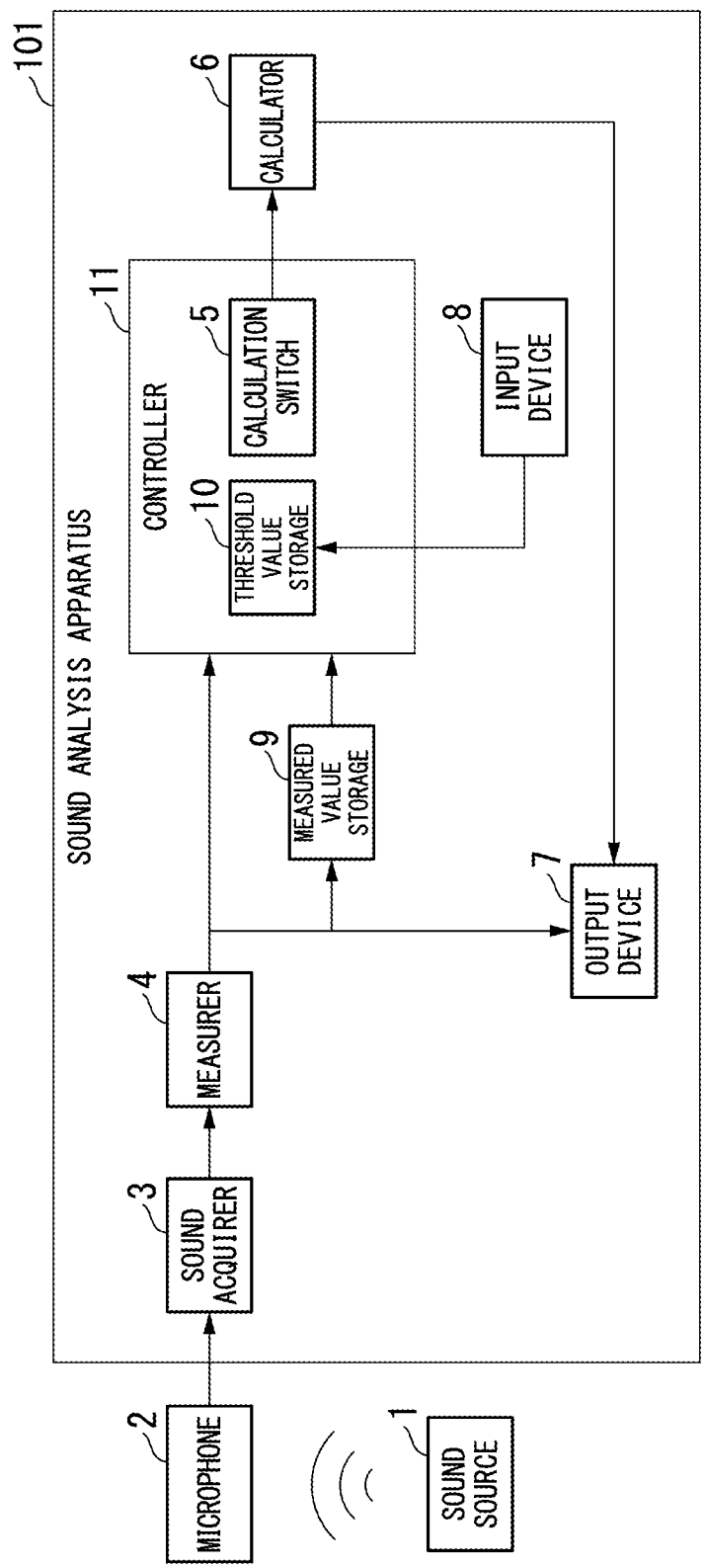
FIG. 1 is a block diagram showing a schematic functional configuration of a sound analysis apparatus according to a first embodiment of the present invention.

FIG. 1 is a block diagram showing a schematic functional diagram of a sound analysis apparatus according to the present embodiment. As illustrated, a sound analysis apparatus 101 includes a microphone 2, a sound acquirer 3, a measurer 4, a calculator 6, an output device 7, an input device 8, a measured value storage 9, and a controller 11. The controller 11 includes a calculation switch 5 and a threshold value storage 10.

Meanwhile, the sound analysis apparatus is also called a "volume indicator."

The aforementioned functional parts are realized, for example, using electronic circuits. In addition, each functional part may include a storage means such as a semiconductor memory or a magnetic hard disk device inside thereof as necessary. Further, each function may be realized by a computer and software.

A sound source 1 is a sound source of a sound that is a target to be analyzed by the sound analysis apparatus 101. The type of the sound source to be targeted by the sound analysis apparatus 101 is not particularly limited. For example, the sound source is operation sounds of apparatuses, equipment and the like in predetermined places in factories and plants. Here, plants may include plants that manage and control well sites, such as gas fields and oil fields, and surroundings thereof, plants that manage and control power generation such as hydroelectric power generation, thermal power generation and nuclear power generation, plants that manage and control environmental power generation such as solar energy generation and wind power generation, plants that manage and control water and sewage, dams and the like, etc. in addition to industrial plants such as chemical plants. Alternatively, the sound source is operation sounds of machines and the like in sites where buildings, facilities and the like are constructed, for example.

The microphone 2 captures sounds in an environment where it is placed and converts the captured sounds into electrical signals. The microphone 2 may be embedded in the sound analysis apparatus 101 or externally attached to the sound analysis apparatus 101.

The sound acquirer 3 acquires a sound signal output from the microphone 2. The sound acquirer 3 may acquire an analog signal or a digital signal representing a sound from a certain device instead of the microphone 2.

The measurer 4 measures a volume level of a sound acquired by the sound acquirer 3 with a predetermined sampling frequency. That is, the measurer 4 outputs time-series data of numerical values representing volumes based on an acquired sound signal. Here, the sampling frequency is appropriately determined. As an example, to measure and analyze a sound in an audible range, a sampling frequency in the range of 40 kHz to 50 kHz is used. The measurer 4 transfers measured volume level data (measured values) to the calculator 6, the output device 7 and the controller 11.

The measurer 4 may output a plurality of types of measured values. For example, the measurer 4 outputs measured values that have been measured with a relatively high sampling frequency for analysis processing such as frequency analysis and outputs measured values that have been measured with a relatively low sampling frequency for determination of control based on volumes.

The calculation switch 5 is a switch for switching whether processing performed by the calculator 6 is performed. The calculation switch 5 is in any of an on state and an off state. Specifically, the calculation switch 5 is a switch that switches to an on state when the calculator 6 is operated and switches to an off state when the calculator 6 is not operated.

The calculator 6 performs processing of analyzing a sound acquired by the sound acquirer 3. Specifically, the calculator 6 acquires numerical value data of a time series representing volume levels from the measurer 4 and performs analysis processing (frequency analysis as a specific example) of the sound. As an example, the calculator 6 performs a fast Fourier transform (FFT). That is, the calculator 6 performs calculation for analyzing time-series data of numerical values output from the measurer 4. The numerical value data of the time series acquired by the calculator 6 is obtained according to a predetermined sampling frequency. The calculator 6 operates (performs calculation for the aforementioned analysis processing) when the calculation switch 5 is in an on state and does not operate (does not perform calculation) when the calculation switch 5 is in an off state. The calculator 6 outputs power data for each of finely divided frequency bands as results of frequency analysis processing. The calculator 6 outputs processing result data to the output device 7.

The output device 7 outputs volume measurement data transferred from the measurer 4, and frequency analysis result data transferred from the calculator 6 during the operation of the calculator 6 to the outside of the sound analysis apparatus.

The output device 7 transmits the volume measurement data and the frequency analysis result data to other external apparatuses, for example, through wired communication or wireless communication. In addition, the output device 7 may write the volume measurement data and the frequency analysis result data on a storage medium such as a magnetic hard disk device or a semiconductor memory.

That is, the output device 7 outputs time-series data output from the measurer 4 and calculation results of the calculator 6 to an external device and the like.

The input device 8 receives an input from a user. Specifically, the input device 8 receives an input such as an operation of touching a screen of a touch panel, an operation of tapping on a keyboard, or an operation of clicking a mouse performed by the user. For example, the input device 8 writes a threshold value input by the user in the threshold value storage 10 in the controller 11. In other words, the input device 8 receives a numerical value for setting a threshold value to be stored in the threshold value storage 10 from the outside. The meaning of this threshold value will be described later.

The measured value storage 9 stores data of numerical values acquired as measurement results of the measurer 4 at least temporarily. In other words, the measured value storage 9 stores numerical values (numerical values having been output in the past) output from the measurer 4 at a predetermined timing. Data stored in the measured value storage 9 is read by the controller 11. A timing at which data is written or updated in the measured value storage 9 will be described later.

The threshold value storage 10 stores a threshold value used for determination processing in the controller 11. The threshold value is a value input through the input device 8. The threshold value storage 10 can also store a plurality of threshold values. Specific types and roles of threshold values will be described later.

The controller 11 determines whether the calculator 6 needs to be operated based on data transferred from the measurer 4, data read from the measured value storage 9 and data of a threshold value stored in the threshold value storage 10 and controls operation/non-operation of the calculator 6. Specifically, the controller 11 switches the calculation switch 5 on or off based on a determination result. In other words, the controller 11 controls the calculation switch 5 such that the calculation switch 5 switches on when a measured value that is a numerical value output from the measurer 4 is included within an analysis target range (abnormality range) that is a range in which the measured value is determined to be an analysis target and switches off when the measured value is not included within the analysis target range.

In addition, the controller 11 determines whether the aforementioned measured value is included within the analysis target range according to whether a difference obtained by subtracting a numerical value stored in the measured value storage 9 from the measured value output from the measurer 4 or the absolute value of the difference is in a predetermined range (for example, whether the difference or the absolute value is equal to or greater than a predetermined value).

Further, the controller 11 determines whether the measured value is included within the analysis target range (abnormality range) based on a threshold value stored in the threshold value storage 10.

Meanwhile, instead of the controller 11, the calculator 6 may determine whether the aforementioned measured value is included within the analysis target range according to whether a difference obtained by subtracting a numerical value stored in the measured value storage 9 from the measured value output from the measurer 4 or the absolute value of the difference is in a predetermined range (for example, whether the difference or the absolute value is equal to or greater than a predetermined value). Further, instead of the controller 11, the calculator 6 may determine whether the measured value is included within the analysis target range (abnormality range) based on a threshold value stored in the threshold value storage 10. In such cases, the calculator 6 controls whether to perform calculation for analysis processing based on results of determination itself with respect to whether the measured value is included within the analysis target range.

Here, a control method in charge of the controller 11 will be described as a feature of the present embodiment.

Meanwhile, a variable v represents a measured value of a volume. The unit of the value of the variable v is, for example, a decibel (dB) value of a sound pressure level or phon computed based on the decibel value. A specific example of transition of measured values will be described later with reference to FIG. 2.

Meanwhile, a duration Tini, values Vsta, Vmem and Vth with respect to a volume, and the like are appropriately defined in the following description.

In an initial state immediately after start of the sound analysis apparatus 101, the controller 11 controls the calculation switch 5 such that the calculation switch 5 switches off. That is, the calculator 6 does not operate in the initial state.

In the initial state immediately after start of the sound analysis apparatus 101, no past measured values have been stored in the measured value storage 9. However, even immediately after start of the sound analysis apparatus 101, if there are records of operation of the sound analysis apparatus 101 earlier than start of the sound analysis apparatus 101, the measured value storage 9 may maintain past measured values at that time.

After start of the sound analysis apparatus 101, when a state in which variations of a volume v are equal to or less than a predetermined quantity Vsta has continued for a predetermined time Tini, the measured value storage 9 stores a predetermined volume value. Here, the value stored in the measured value storage 9 is, for example, the value of a volume v at the last time of the period of the time Tini (predetermined timing) (however, another time of the period may be used instead). A measured value stored in the measured value storage 9 at that point in time is referred to as Vmem.

The controller 11 performs determination based on a measurement result (a value of the variable v) measured by the measurer 4 at the present time and a past measurement result Vmem stored in the measured value storage 9. As an example, the controller 11 determines whether a difference between the measurement result v at the present time and the past measurement result Vmem, that is, v−Vmem, is equal to or greater than a predetermined threshold value Vth. That is, the controller 11 determines whether the following expression (1) is true or false.

$$(v-Vmem) \geq Vth \qquad \text{Expression (1)}$$

However, the controller 11 may perform determination according to another expression instead of expression (1).

As an example, the controller 11 determines whether the absolute value of the difference between the measurement result v at the present time and the past measurement result Vmem is equal to or greater than the predetermined threshold value Vth. In this case, the controller 11 determines whether the following expression (2) is true or false.

$$|v-Vmem| \geq Vth \qquad \text{Expression (2)}$$

Here, "| |" represents the absolute value of a numerical value in expression (2). Further, the controller 11 may determine true/false according to other criteria. Description will be continued based on expression (1) as representative below.

At a timing at which expression (1) becomes true, the controller 11 switches the calculation switch 5 on. That is, the controller 11 controls the calculator 6 such that the calculator 6 operates at that timing.

Thereafter, the controller 11 maintains the calculation switch 5 in the on state while expression (1) remains true. That is, the controller 11 controls the calculator 6 such that the calculator 6 continuously operates.

Then, the controller 11 switches the calculation switch 5 off at that timing the moment expression (1) becomes false. That is, the controller 11 controls the calculator 6 such that the calculator 6 does not operate at that timing.

As described above, the controller 11 unmanually appropriately performs on/off control of the calculation switch 5 without a user instruction through the input device 8 by performing control in response to a volume measurement value v at the present time. That is, the controller 11 automatically controls the calculator 6 such that the calculator 6 operates or does not operate. Accordingly, it is possible to minimize power consumption if the calculator 6 does not operate.

Figure 2:
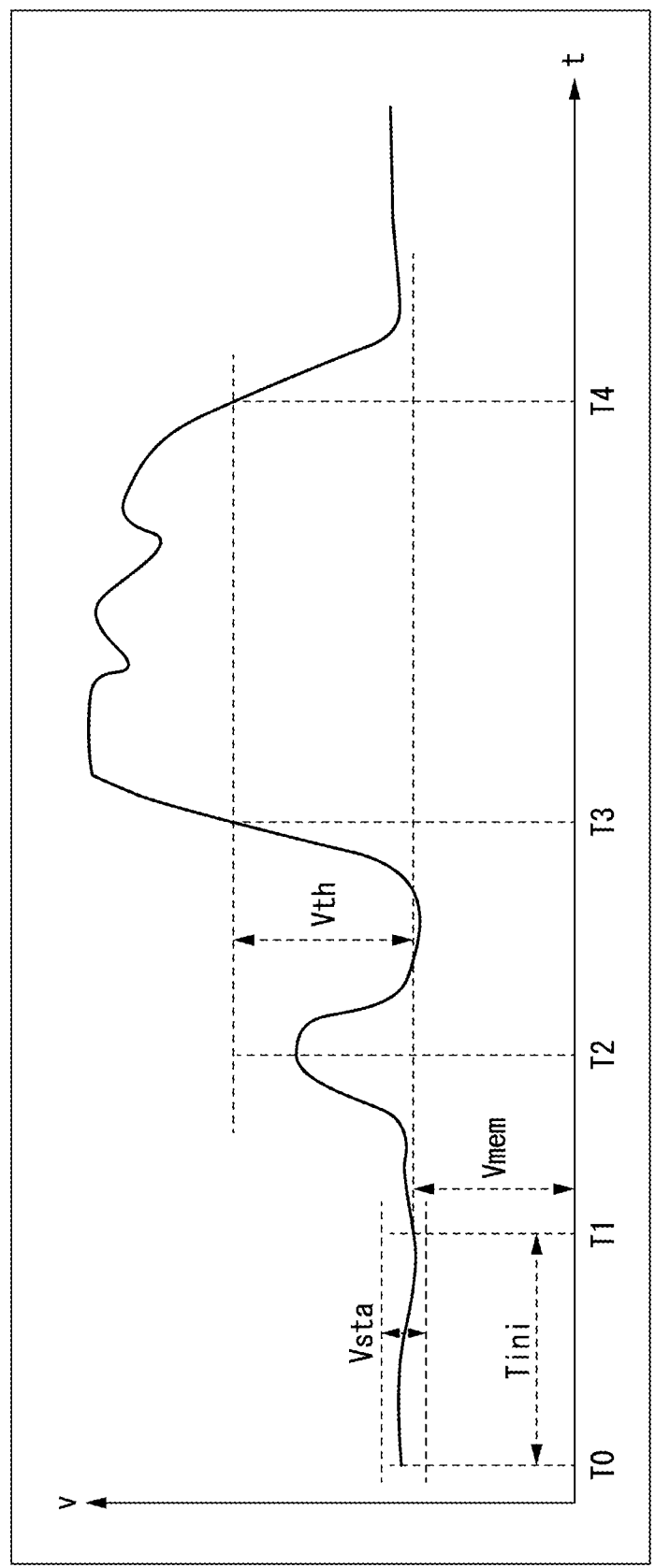
FIG. 2 is a diagram for describing control according to the first embodiment and is a graph showing an example of time transition of volume measurement values measured by a measurer.

FIG. 2 is a graph showing an example of time transition of a volume measurement value v measured by the measurer 4. In this graph, the horizontal axis (t) corresponds to time and the vertical axis (v) corresponds to a volume measurement value. Hereinafter, description will be made according to this graph.

The sound analysis apparatus 101 has been started at time T0. At this time, past measured values have not been stored yet in the measured value storage 9. In addition, the calculation switch 5 is in an off state by the controller 11.

A time Tini has elapsed from time T0 to T1. In addition, a state in which variations of the volume measurement value v are equal to or less than a predetermined quantity Vst has continued in the period from time T0 to T1. Accordingly, the measured value storage 9 stores the value of the volume measurement value v at time T1 at the timing of time T1. That is, the measured value storage 9 stores a value Vmem as a past measured value inside thereof after time T1. The value Vmem stored in the measured value storage 9 in this condition can be assumed to be a volume level of usual time (normal time).

Thereafter, the controller 11 repeatedly determines whether the aforementioned expression (1) is true or false. For example, although the volume measurement value v temporarily increases at time T2 in the figure, expression (1) no longer becomes true at time T2 and the vicinity thereof. That is, this is because a value (difference) obtained by subtracting the value Vmem stored in the measured value storage 9 from the volume measurement value v does not increase to more than the threshold value Vth. That is, the controller 11 maintains the calculation switch 5 in the off state in this period.

At time T3, expression (1) becomes true for the first time after time T1. That is, the value obtained by subtracting the value Vmem stored in the measured value storage 9 from the volume measurement value v becomes equal to or greater than the threshold value Vth. Accordingly, the controller 11 switches the calculation switch 5 on at time T3.

Then, the state in which expression (1) is true is maintained. Accordingly, the controller 11 maintains the calculation switch 5 in the on state.

At time T4, expression (1) becomes a false state. That is, the value obtained by subtracting the value Vmem stored in the measured value storage 9 from the volume measurement value v becomes less than the threshold value Vth. Accordingly, the controller 11 switches the calculation switch 5 off at time T4.

After time T4, the state in which expression (1) is false is maintained in the range of the illustrated graph. Accordingly, the controller 11 maintains the calculation switch 5 in the off state.

As in the above-describe example, the controller 11 appropriately switches states of the calculation switch 5 in response to the value of the volume measurement value v. Accordingly, the calculator 6 becomes an operation state (when the calculation switch 5 is on) or a non-operation state (when the calculation switch 5 is off).

According to the present embodiment, the controller 11 compares a latest volume measurement result (measured value v) with a past measured value Vmem stored in the measured value storage 9, as described above. Then, the controller 11 determines that an abnormality has occurred when a difference that is a comparison result exceeds a threshold value (if expression (1) is true) and the calculator 6 automatically performs analysis processing based on control of the controller 11. That is, it is possible to automatically switch between execution and non-execution of analysis processing even if user operation is not performed. Accordingly, it is possible to cause the calculator 6 not to operate when no longer needed such as a normal case and thus can minimize power consumption of the calculator 6. In addition, it is possible to automatically operate the calculator 6 in an abnormal case or when likelihood of abnormality is considered to be high while maintaining low power consumption, and thus analysis omission can be prevented.

Second Embodiment

Next, a second embodiment of the present invention will be described. Meanwhile, description of matters that have already been described in the previous embodiments may be omitted below. Here, description will be made focusing on characteristics matters of the present embodiment.

Figure 3:
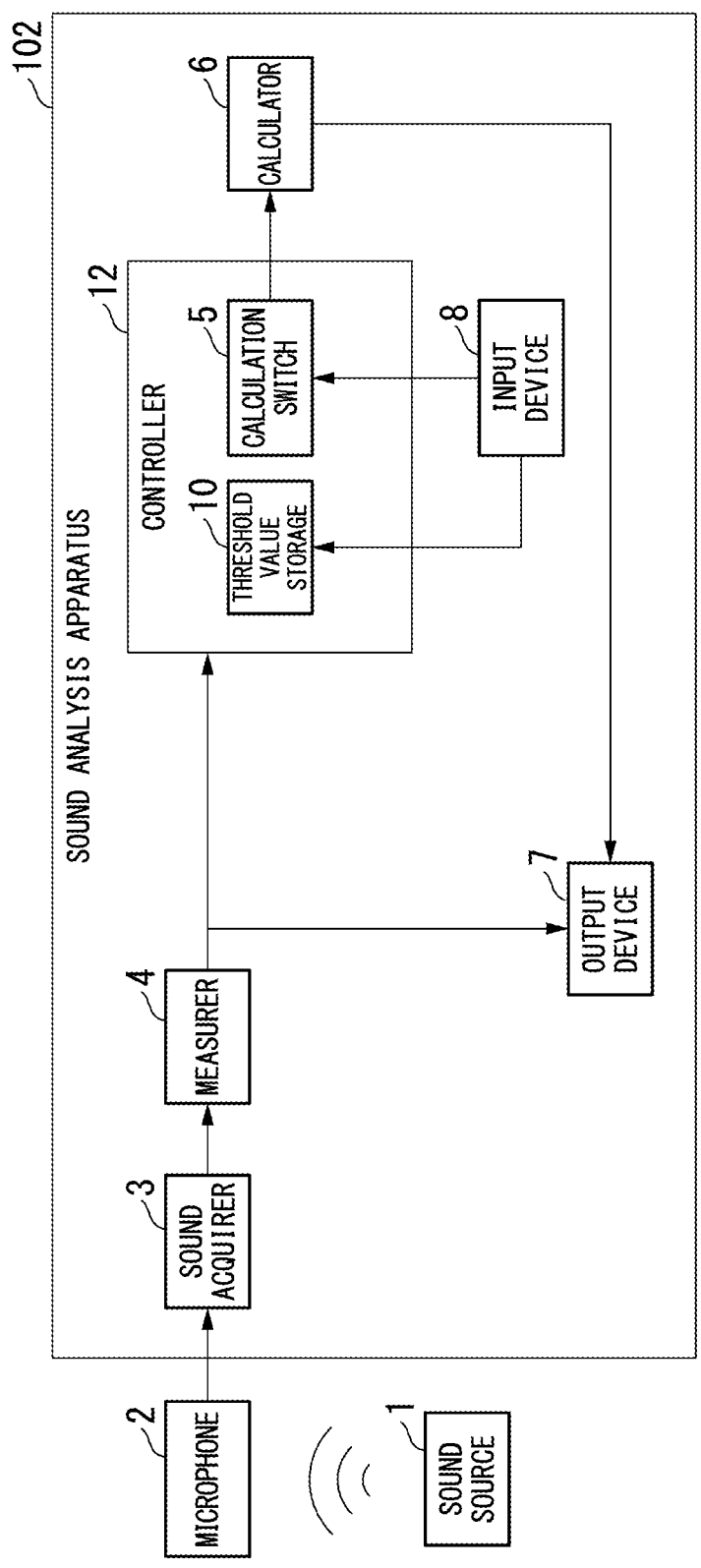
FIG. 3 is a block diagram showing a schematic functional configuration of a sound analysis apparatus according to a second embodiment of the present invention.

FIG. 3 is a block diagram showing a schematic functional configuration of a sound analysis apparatus 102 according to the second embodiment. As illustrated, the sound analysis apparatus 102 includes a microphone 2, a sound acquirer 3, a measurer 4, a calculator 6, an output device 7, an input device 8, and a controller 12. The controller 12 includes a calculation switch 5 and a threshold value storage 10.

The sound analysis apparatus 102 according to the present embodiment does not have the measured value storage 9 included in the sound analysis apparatus 101 of the first embodiment. In addition, the controller 12 according to the present embodiment performs determination according to determination criteria different from those of the controller 11 of the first embodiment and control based on determination results.

In the present embodiment, the input device 8 also receives numerical values for setting threshold values to be stored in the threshold value storage 10 from the outside. In addition, in the present embodiment, the input device 8 switches on/off states of the calculation switch 5, for example, according to user operation.

In the present embodiment, the controller 12 performs determination according to comparison between a latest volume measurement value v of the measurer 4 and a threshold value stored in the threshold value storage 10 because a measured value storage which stores past measured values is not provided. Meanwhile, the input device 8 writes appropriate threshold values in the threshold value storage 10 based on user operation.

Specifically, the controller 12 compares a measured value v that is a measurement result obtained by the measurer 4 at the present time with a predetermined threshold value Vth2 set in advance and determines whether the measured value v is equal to or greater than the threshold value Vth2. That is, the controller 12 determines whether the following expression (3) is true or false.

$$v \geq Vth2 \qquad \text{Expression (3)}$$

However, the controller 12 may determine whether the following expression (4) instead of expression (3) is true or false.

$$v \leq Vth2 \qquad \text{Expression (4)}$$

That is, the present embodiment is characterized in that the sound analysis apparatus 102 does not have a measured value storage and the controller 12 compares a latest measured value with a threshold value instead of a difference between the latest measured value and a past measured value. That is, the calculation switch 5 is switched based on relative volume change based on a measurement result in a case that it is assumed to be a normal case in the first embodiment, whereas the calculation switch 5 is switched based on the level of a volume itself which is a measurement result in the present embodiment.

The controller 12 causes the calculation switch 5 to be switched off when expression (3) (the same applies to a case in which other expressions instead of this expression is used and also applies to the following) is false, that is, when the measured value v is a normal value and is less than the threshold value Vth2. That is, the controller 12 controls the calculator 6 such that the calculator 6 does not operate.

The controller 12 causes the calculation switch 5 to be switched on when expression (3) is true, that is, when the measured value v is an abnormal value and is equal to or greater than the threshold value Vth2. That is, the controller 12 controls the calculator 6 such that the calculator 6 operates to perform frequency analysis processing.

Figure 4:
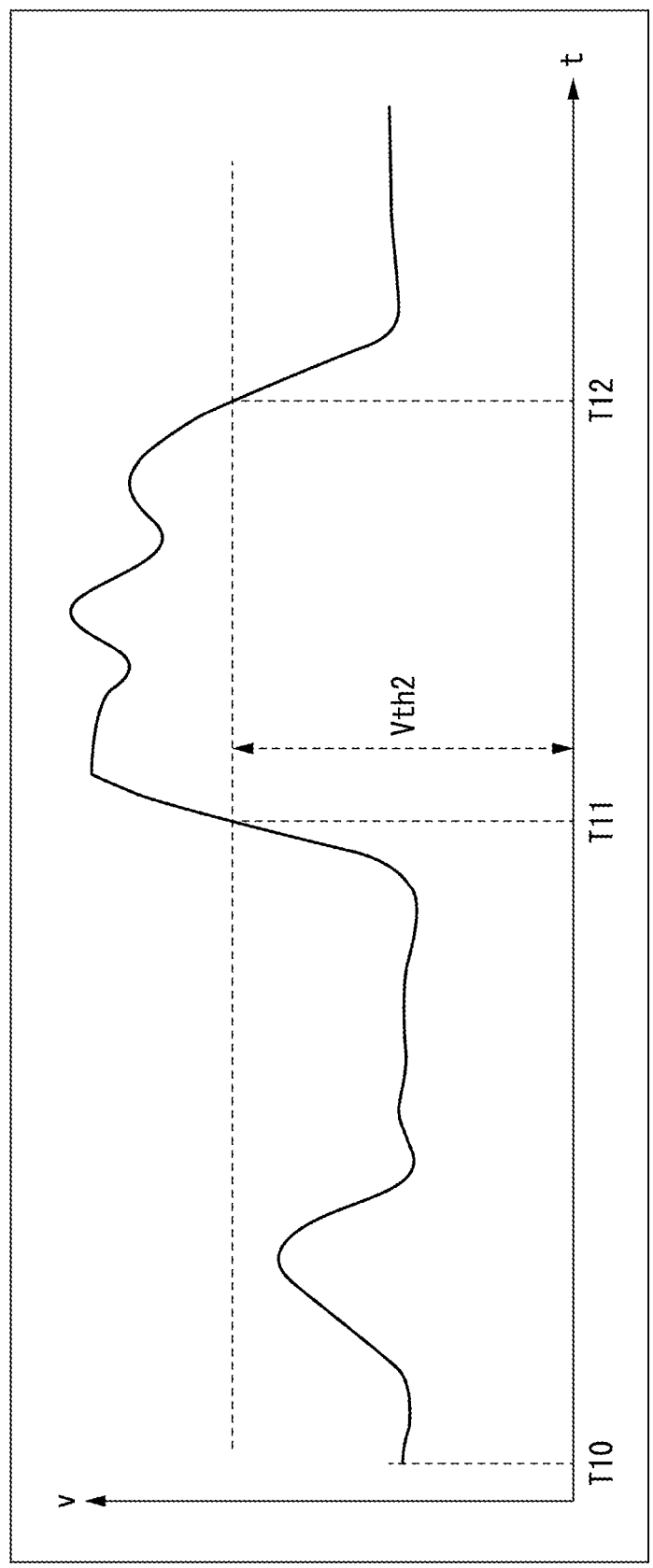
FIG. 4 is a diagram for describing control according to the second embodiment and is a graph showing an example of time transition of volume measurement values measured by a measurer.

FIG. 4 is a graph showing an example of time transition of a volume measurement value v measured by the measurer 4. In this graph, the horizontal axis (t) corresponds to time and the vertical axis (v) corresponds to a volume measurement value. Hereinafter, description will be made according to this graph.

At time T10, the threshold value Vth2 has already been set in the threshold value storage 10.

At the point in time T10, expression (3) is false. That is, the controller 12 sets the calculation switch 5 in an off state.

In a period from time T10 to time T11, expression (3) is false. That is, the controller 12 maintains the calculation switch 5 is in the off state.

At time T11, the measured value v becomes equal to or greater than the threshold value Vth2. That is, expression (3) becomes true. At this timing, the controller 12 switches the calculation switch 5 on.

In a period from time T11 to time T12, expression (3) is true. That is, the controller 12 maintains the calculation switch 5 is in the on state.

After time T12, the measured value v becomes less than the threshold value Vth2. That is, expression (3) becomes false. At this timing, the controller 12 switches the calculation switch 5 off.

As in the above example, the controller 12 appropriates switch states of the calculation switch 5 in response to values of the volume measurement value v. Accordingly, the calculator 6 becomes an operation state (when the calculation switch 5 is on) or a non-operation state (when the calculation switch 5 is off).

According to the present embodiment, the controller 12 compares the measured value v at the present time with the set threshold value Vth2. When the measured value v has become equal to or greater than the threshold value Vth2, the controller 12 switches the calculation switch 5 on and thus the calculator 6 automatically starts operation. On the contrary, when the measured value v has become less than the threshold value Vth2, the controller 12 switches the calculation switch 5 off and thus the calculator 6 is automatically shifted to a non-operation state. In this manner, analysis processing (frequency analysis processing) is automatically performed or stopped even if the user does not change states of the calculation switch 5 by operating the input device 8. Further, when the calculation switch 5 is off, power consumption of the calculator 6 can be minimized.

Third Embodiment

Next, a third embodiment of the present invention will be described. Meanwhile, description of matters that have already been described in the previous embodiments may be omitted below. Here, description will be made focusing on characteristics matters of the present embodiment.

Figure 5:
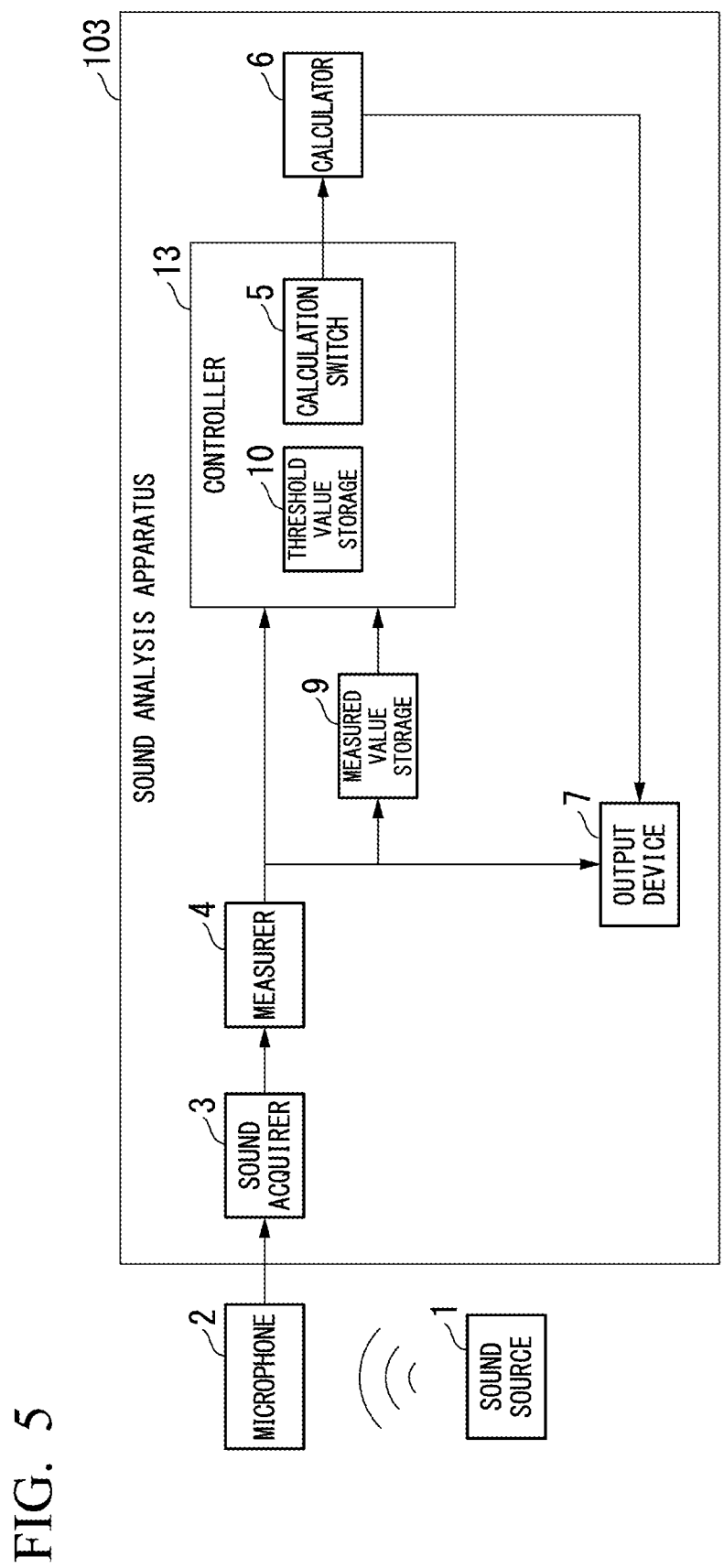
FIG. 5 is a block diagram showing a schematic functional configuration of a sound analysis apparatus according to a third embodiment of the present invention.

FIG. 5 is a block diagram showing a schematic functional configuration of a sound analysis apparatus 103 according to the third embodiment. As illustrated, the sound analysis apparatus 103 includes a microphone 2, a sound acquirer 3, a measurer 4, a calculator 6, an output device 7, a measured value storage 9, and a controller 13. The controller 13 includes a calculation switch 5 and a threshold value storage 10.

The sound analysis apparatus 103 according to the present embodiment does not include the input device 8 provided in the first and second embodiments. Accordingly, threshold values cannot be set according to user operation or the like in the threshold value storage 10 in the present embodiment. Meanwhile, threshold values are set in advance in the threshold value storage 10. In addition, the calculation switch 5 cannot switch states according to user operation or the like and is switched only according to determination of the controller 13 in the present embodiment.

Setting of a threshold value (threshold value storage 10) can be changed through the input device 8 in the first embodiment, whereas the sound analysis apparatus 103 according to the present embodiment performs processing using only a threshold value stored in advance in the threshold value storage 10.

Except for the aforementioned point, control according to the controller 13 is the same as control of the controller 11 in the first embodiment. Accordingly, detailed description thereof is omitted here.

According to the present embodiment, it is possible to perform the same control as that in the first embodiment. In addition, according to the present embodiment, it is possible to configure a sound analysis apparatus without an input device.

Fourth Embodiment

Next, a fourth embodiment of the present invention will be described. Meanwhile, description of matters that have already been described in the previous embodiments may be omitted below. Here, description will be made focusing on characteristics matters of the present embodiment.

Figure 6:
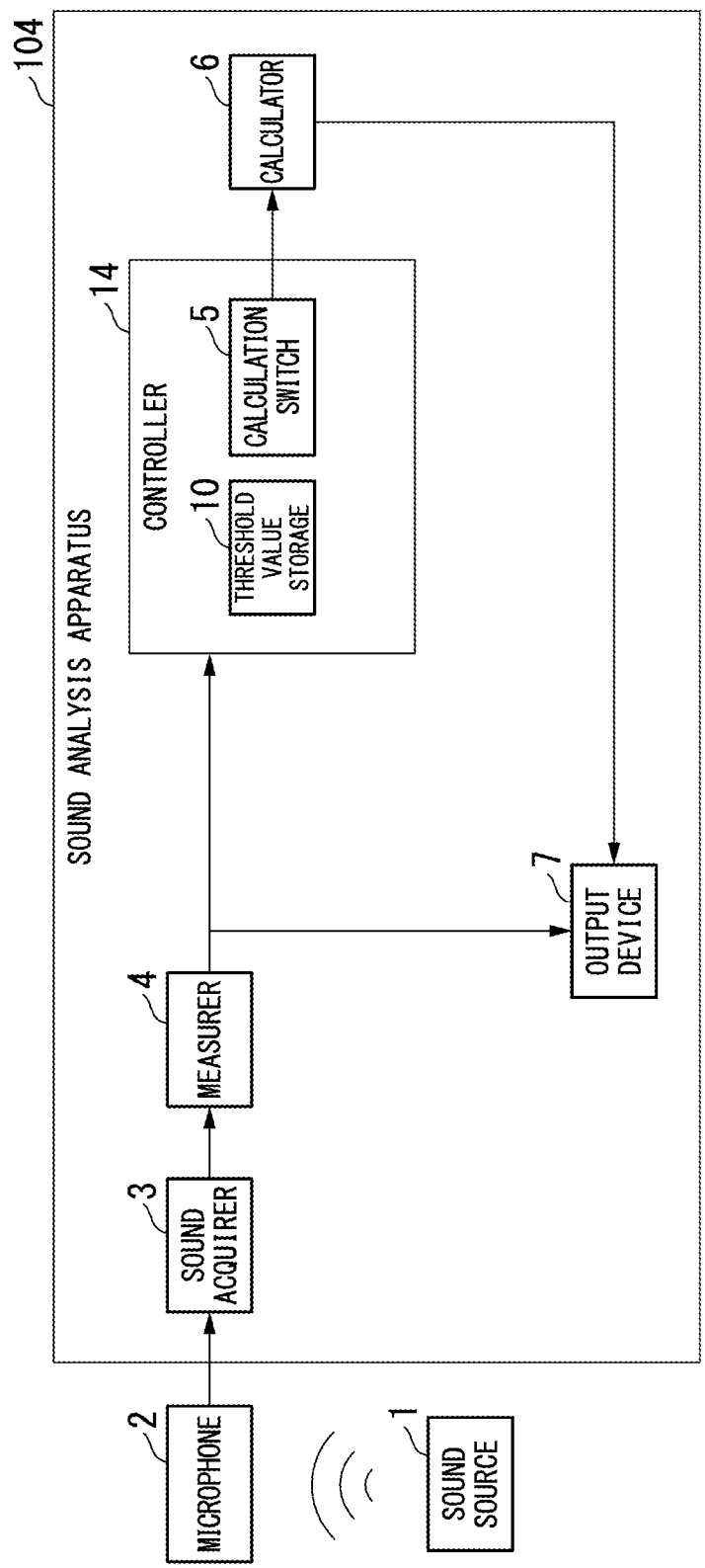
FIG. 6 is a block diagram showing a schematic functional configuration of a sound analysis apparatus according to a fourth embodiment of the present invention.

FIG. 6 is a block diagram showing a schematic functional configuration of a sound analysis apparatus 104 according to the fourth embodiment. As illustrated, the sound analysis apparatus 104 includes a microphone 2, a sound acquirer 3, a measurer 4, a calculator 6, an output device 7, and a controller 14. The controller 14 includes a calculation switch 5 and a threshold value storage 10.

The sound analysis apparatus 104 according to the present embodiment does not include the input device 8 provided in the first embodiment and does not also include the measured value storage 9 provided in the first embodiment.

In other words, the sound analysis apparatus 104 has a configuration in which the input device 8 has been excluded from the sound analysis apparatus 102 of the second embodiment.

Since the sound analysis apparatus 104 of the present embodiment does not include the input device, threshold values cannot be set in the threshold value storage 10 according to user operation or the like. Threshold values are set in advance in the threshold value storage 10. Further, in the present embodiment, the calculation switch 5 cannot switch states according to user operation or the like and is switched only according to determination of the controller 14.

Setting of a threshold value (threshold value storage 10) can be changed through the input device 8 in the second embodiment, whereas the sound analysis apparatus 104 according to the present embodiment performs processing using only a threshold value stored in advance in the threshold value storage 10.

Except for the aforementioned point, control according to the controller 14 is the same as control of the controller 12 in the second embodiment. Accordingly, detailed description thereof is omitted here.

According to the present embodiment, it is possible to perform the same control as that in the second embodiment.

In addition, according to the present embodiment, it is possible to configure a sound analysis apparatus without an input device.

Fifth Embodiment

Next, a fifth embodiment of the present invention will be described. Meanwhile, description of matters that have already been described in the previous embodiments may be omitted below. Here, description will be made focusing on characteristics matters of the present embodiment.

Figure 7:
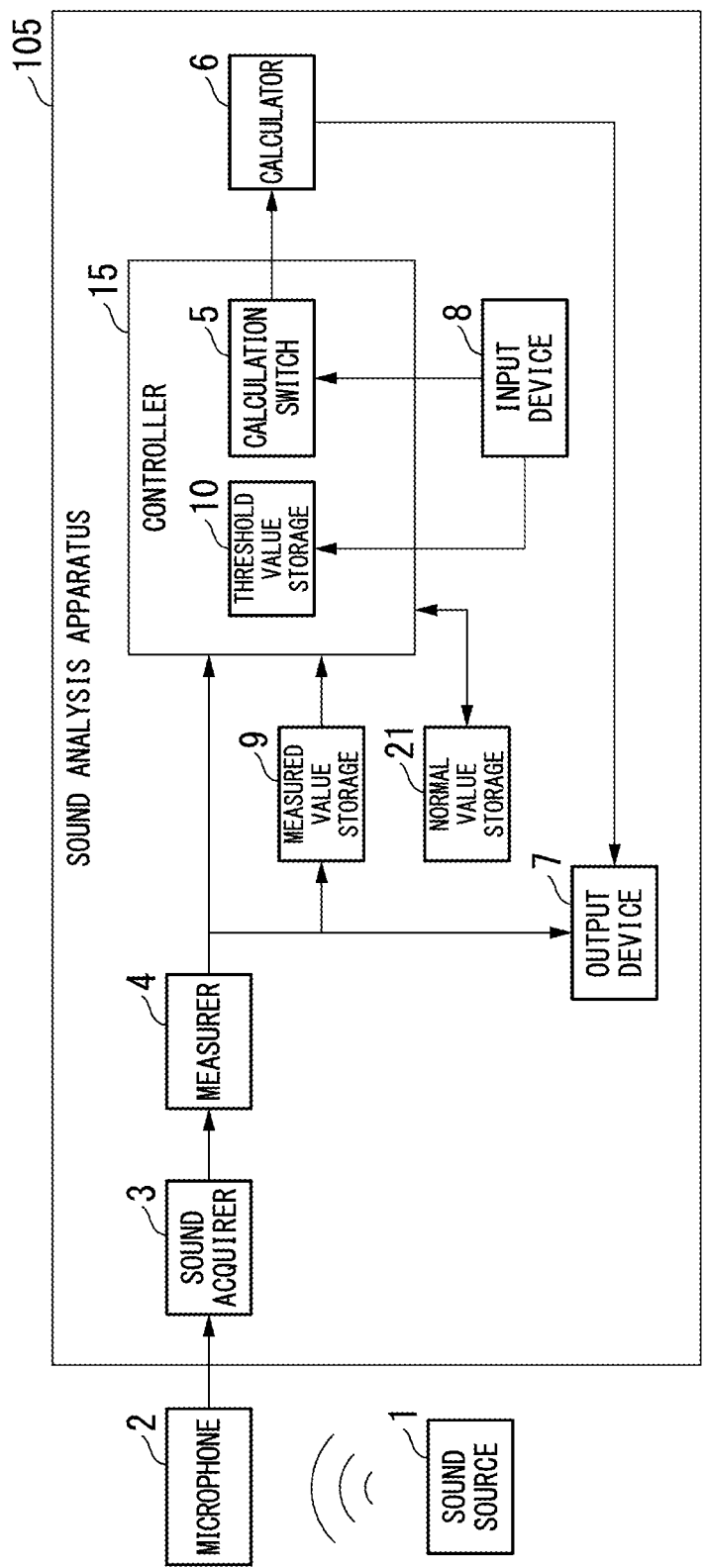
FIG. 7 is a block diagram showing a schematic functional configuration of a sound analysis apparatus according to a fifth embodiment of the present invention.

FIG. 7 is a block diagram showing a schematic functional configuration of a sound analysis apparatus 105 according to the fifth embodiment. As illustrated, the sound analysis apparatus 105 includes a microphone 2, a sound acquirer 3, a measurer 4, a calculator 6, an output device 7, an input device 8, a measured value storage 9, a controller 15, and a normal value storage 21. The controller 15 includes a calculation switch 5 and a threshold value storage 10.

The sound analysis apparatus 105 is characterized in that it includes the normal value storage 21. The normal value storage 21 stores past normal values of volume measurement values. The controller 15 reads and writes data of the normal value storage 21.

In the present embodiment, the input device 8 receives numerical values for setting threshold values to be stored in the threshold value storage 10 from the outside and on/off states of the calculation switch 5 are switched, according to an operation performed by a user as in the second embodiment.

In the present embodiment, the controller 15 performs control to be described below.

The controller 15 determines normal values based on past measured values output from the measurer 4 and writes the normal values in the normal value storage 21. When the controller 15 determines whether to switch the calculation switch off (transition from a first state to a second state) when the calculation switch 5 is in an on state, the controller 15 performs determination based on a relationship between a normal value read from the normal value storage 21 and the aforementioned measured value.

More specifically, it is as follows. When measured value data is transferred from the measurer 4 to the controller 15, the controller 15 checks the state of the calculation switch 5. The controller 15 performs the following operation depending on the state of the calculation switch 5. Meanwhile, the values Vsta, Vmem and Vth have been described in the first embodiment. Here, the values Vsta and Vth are appropriately provided. In addition, the value Vmem has already been written in the measured value storage 9 in the following description.

Further, the calculator 6 instead of the controller 15 may determine a normal value based on past measured value output from the measurer 4, writes the normal value in the normal value storage 21, and determine whether transition from the first state to the second state occurs. In this case, the calculator 6 performs determination based on a relationship between a normal value read from the normal value storage 21 and the aforementioned measured value. In this case, the calculator 6 controls whether to perform calculation for analysis processing based on a result of determination thereof with respect to whether the measured value is included within an analysis target range (the first state).

When the calculation switch 5 is in an off state, the controller 15 performs the same operation as that in the case of the first embodiment. That is, the controller 15 determines whether expression (1) is true or false (the same also applies to a case in which expressions other than expression (1) are used). When expression (1) is true, the controller 15 switches the calculation switch 5 on. When expression (1) is false, the controller 15 maintains the calculation switch 5 in the off state.

Meanwhile, in the present embodiment, a value (past measurement result value) Vmem stored in the measured value storage 9 is written to the normal value storage 21 when the controller 15 switches the calculation switch 5 from an off state to an on state. The value stored in the normal value storage 21 is referred to as Vnormal.

On the other hand, when the calculation switch 5 is in an on state, the controller 15 compares a latest measured value received from the measurer 4 with the value stored in the normal value storage 21 and performs control depending on the comparison result. At this time, the controller 15 determines whether the following expression (5) or (6) is true or false.

$$v \geq Vnormal \qquad \text{Expression (5)}$$

$$|v - Vnormal| \geq Vth3 \qquad \text{Expression (6)}$$

Here, expression (5) corresponds to expression (1). That is, when determination using expression (1) is performed above, expression (5) is used here. On the other hand, expression (6) corresponds to expression (2). That is, when determination using expression (2) is performed above, expression (6) is used here. Meanwhile, Vth3 in expression (6) is a further another threshold value. The value of the threshold value Vth3 is also appropriately set.

Then, the controller 15 switches the calculation switch 5 off if expression (5) or (6) (any expression used for determination) is false. The controller 15 maintains the calculation switch 5 in an on state if expression (5) or (6) is true.

Figure 8:
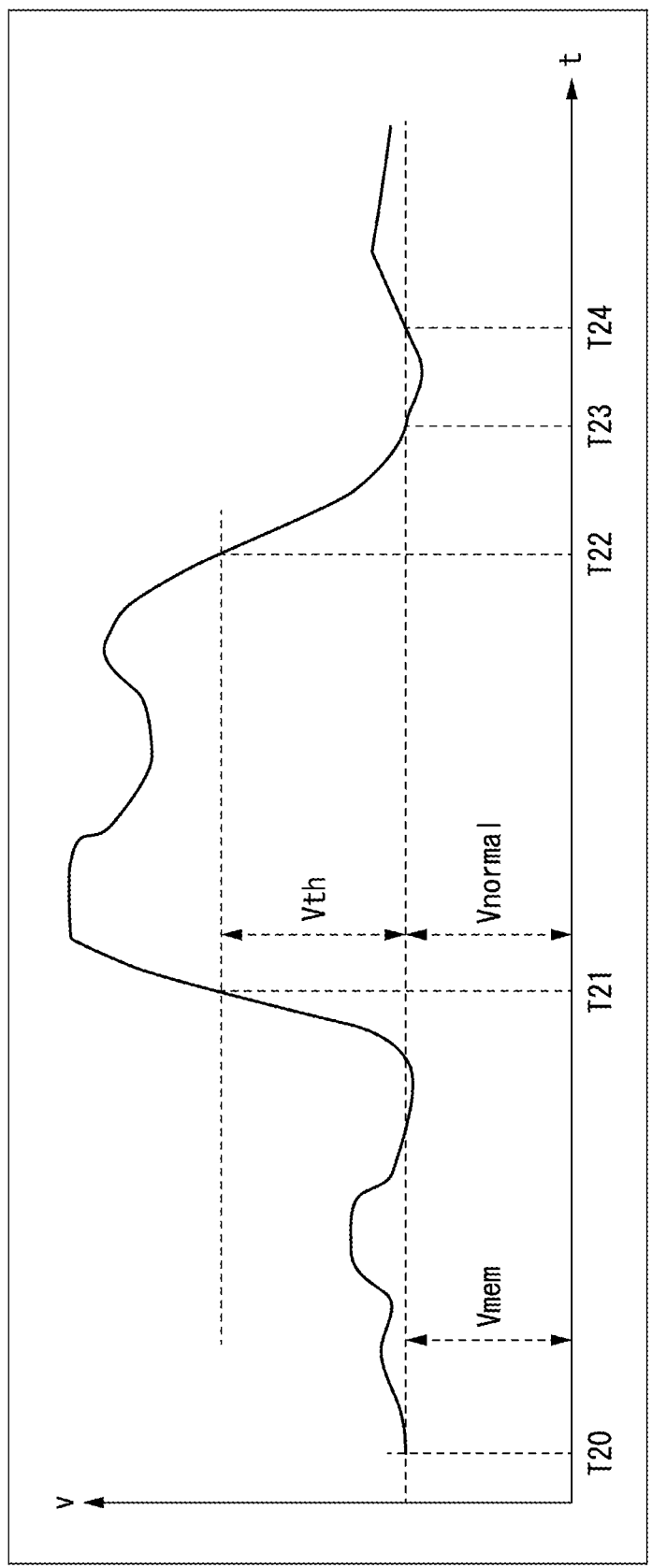
FIG. 8 is a diagram for describing control according to the fifth embodiment and is a graph showing an example of time transition of volume measurement values measured by a measurer.

FIG. 8 is a graph showing an example of time transition of a volume measurement value v measured by the measurer 4. In this graph, the horizontal axis (t) corresponds to time and the vertical axis (v) corresponds to a volume measurement value. Hereinafter, description will be made according to this graph.

Measurement according to the sound analysis apparatus 105 starts from time T20.

At the point in time T20, a past measured value Vmem has been stored in in the measured value storage 9.

In addition, a threshold value Vth3 has also been set. Further, the calculation switch 5 in an off state.

After time T20, a measured value v changes, but a state in which expression (1) is false is continued for a while.

At time T21, the controller 15 determines that expression (1) is true. Accordingly, the controller 15 switches the calculation switch 5 on at this timing. In addition, the controller 15 writes a value Vmem stored in the measured value storage 9 at this time to the normal value storage 21 as a normal value. That is, Vnormal=Vmem.

After time T21, a state in which the measured value v exceeds the value of (Vmem+Vth3) is continued. In the meantime, the controller 15 maintains the calculation switch 5 in the on state.

After time T22, the measured value v is less than the value of (Vmem+Vth3). That is, expression (1) becomes false. Accordingly, when the calculation switch 5 is on, the controller performs determination based on expression (5), as described above. Expression (5) is still true even after time T22.

At time T23, the measured value v becomes equal to a value Vnormal. In addition, the measured value v is less than Vnormal after time T23. That is, expression (5) is false.

When expression (5) has become false, the controller 15 switches the calculation switch 5 off.

Since the calculation switch 5 is in the off state after time T23, the controller 15 determines whether to switch the calculation switch 5 according to expression (1), as described above. That is, although expression (5) becomes true after time T24, the controller 15 maintains the calculation switch 5 in the off state because expression (1) is false.

As in the above example, the controller 15 appropriately switches states of the calculation switch 5 in response to the value of the volume measurement value v. Accordingly, the calculator 6 is shifted to an operation state (when the calculation switch 5 is on) or a non-operation state (when the calculation switch 5 is off).

As described above, the controller 15 of the present embodiment performs determination of whether to switch the calculation switch 5 from an off state to an on state or determination of whether to switch the calculation switch 5 from an on state to an off state based on different criteria. That is, the sound analysis apparatus 105 has hysteresis in a relationship between a measured value v and a state of the calculation switch 5 (i.e., operation/non-operation state of the calculator 6). Accordingly, the controller 15 performs control based on more strict determination criteria in a case in which the calculation switch 5 is switched from an off state to an on state or in a case in which the calculation switch 5 is switched from an on state to an off state. That is, as can be ascertained with reference to the example of FIG. 8, criteria for determining a measured value that has been normal until then to be abnormal are sufficiently stringent and criteria for determining a measured value that has been abnormal until then to be normal are sufficiently alleviated. Accordingly, the controller 15 can prevent chattering of on/off states of the calculation switch. That is, the operation of the sound analysis apparatus is stabilized.

According to the present embodiment, it is possible to determine switching of the calculation switch from an off state to an on state or switching from an on state to an off state according to different criteria. In addition, a normal value is stored and control can be performed according to determination based on the normal value.

First Modified Example of Fifth Embodiment

In the fifth embodiment, the controller 15 writes a value (a past measured value) stored in the measured value storage 9 at a predetermined timing to the normal value storage 21.

As a modified example, the controller 15 may write a normal value (a value assumed to be normal) obtained through a different method in the normal value storage 21.

For example, the controller 15 may determine a value (a normal value) to be written to the normal value storage 21 based on a range of most frequent measured values (a range having a large frequency number of stored measured values when each measured value has been stored) based on statistics of past measured values v. Specifically, the controller 15 obtains a frequency based on past statistics for each range of widths of equal intervals of measured values in advance. Then, a range having a highest frequency is selected. Thereafter, a representative value in the selected range is determined as a normal value. The representative value may be a central value in that range, a statistical median in that range, or a lower limit value or an upper limit value of that range. If a premise that a time for which a normal state is maintained is overwhelmingly longer than a time for which an abnormal state is maintained is used, this determination method is valid. That is, the controller 15 determines a normal value based on frequency.

In addition, the controller may determine a value (a normal value) to be written to the normal value storage 21 based on a range of measured values having highest stability on the basis statistics of past measured values v, for example. Specifically, the controller 15 obtains a correlation between variations of measured values within a predetermined time and ranges to which the measured values belong at that time in advance. Then, the controller selects a range including measured values with highest stability (i.e., small variations within a predetermined time) based on the correlation. Then, a representative value in the selected range is determined as a normal value. With respect to a method of determining a representative value in a predetermined range, the aforementioned method can be used. If a premise that a measured value in a time for which a normal state is maintained is stabilized (a degree of variations with a predetermined time is low) is used, this method is valid. That is, the controller 15 determines a normal value based on stability.

In addition, a normal value may be determined through an integral evaluation method using both the determination method based on frequency and the determination method based on stability.

Further, a normal value may be determined through other methods.

Second Modified Example of Fifth Embodiment

In the fifth embodiment, the sound analysis apparatus 105 has a configuration including the input device 8, the measured value storage 9 and the normal value storage 21.

As a modified example, a sound analysis apparatus as follows may be implemented.

That is, the sound analysis apparatus has a configuration including the measured value storage 9 and the normal value storage 21 without the input device 8. That is, the sound analysis apparatus has a configuration in which the normal value storage 21 has been added to the sound analysis apparatus 103 of the third embodiment.

In this case, the controller writes a normal value determined based on past measured values to the normal value storage 21. Then, when the controller determines whether to switch the calculation switch 5 from an on state to an off state, the controller performs determination based on a result of comparison between a measured value and a normal value.

Sixth Embodiment

Figure 9:
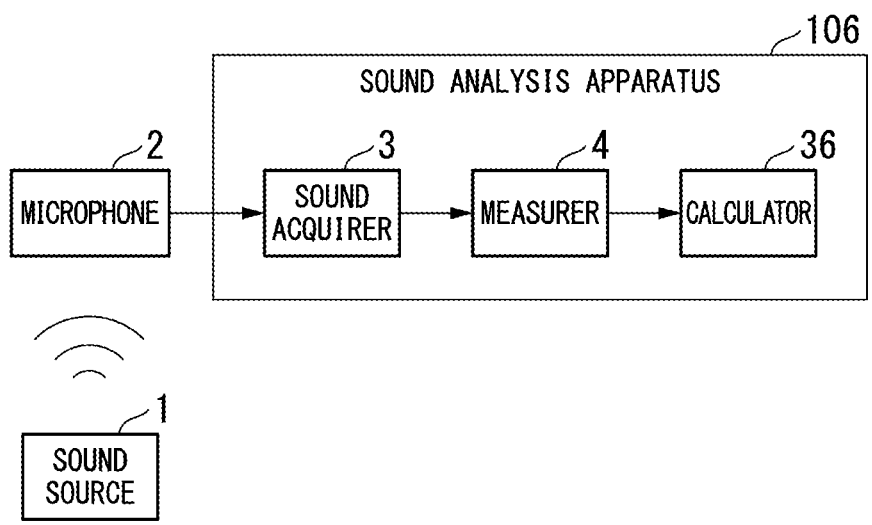
FIG. 9 is a block diagram showing a schematic functional configuration of a sound analysis apparatus according to a sixth embodiment of the present invention.

FIG. 9 is a block diagram showing a schematic functional configuration of a sound analysis apparatus according to a sixth embodiment. As illustrated, the sound analysis apparatus 106 according to the present embodiment includes a sound acquirer 3, a measurer 4 and a calculator 36. The sound acquirer 3 and the measurer 4 in the present embodiment have the same functions as those in the above-described embodiments. That is, the sound acquirer 3 acquires a sound signal. In addition, the measurer 4 outputs time-series data of numerical values representing volume based on the acquired sound signal.

The calculator 36 in the present embodiment is the same as the calculator in the above-described embodiments in that the calculator 36 performs calculation for analyzing time-series data output from the measurer 4, performs the calculation in the case of a first state in which a measured value that is a numerical value output from the measurer 4 is included within an analysis target range that is a range in which the measured value is determined to be an analysis target and does not perform the calculation in the case of a second state in which the measured value is not included in the analysis target range. Further, in the present embodiment, the calculator 36 autonomously determines whether the first state (state in which a measured value that is a numerical value output from the measurer 4 is included within an analysis target range that is a range in which the measured value is determined to be an analysis target) or the second state (state in which the measured value is not included in the analysis target range) based on a measured value of time-series output from the measurer 4. Then, the calculator 36 determines whether to perform calculation for analyzing time-series data depending on a state corresponding to the determination result and controls the operation thereof. That is, the calculator 36 performs the aforementioned calculation in the case of the first state and does not perform the aforementioned calculation in the case of the second state. According to this configuration, it is possible to automatically control whether analysis is performed without human determination. Furthermore, it is possible to minimize necessary power consumption amount.

According to any of the above-described embodiments, it is possible to reduce a delay until frequency analysis is started because determination can be automatically performed without human determination when an abnormality with respect to volume occurs. In addition, it is possible to limit execution of detailed analysis (frequency analysis and the like) of a sound to occurrence of an abnormality. That is, it is possible to minimize a power consumption amount of a sound analysis apparatus. Further, it is not necessary to assign a person for determination because control is automatically performed.

Meanwhile, at least a part of functions of the sound analysis apparatuses in the above-described embodiments and modified examples thereof can be realized as a computer. In such a case, a program for realizing the function may be recorded on a computer-readable recording medium and a computer system may be caused to read and execute the program recorded on the recording medium to realize the function. Meanwhile, here, the "computer system" includes an OS and hardware such as peripheral devices. In addition, the "computer-readable recording medium" refers to portable media such as a flexible disk, a magneto-optic disk, a ROM, and a CD-ROM, a DVD-ROM, and a USB memory, and storage devices such as a hard disk embedded in a computer system. Further, the "computer-readable recording medium" may also include a medium that temporarily dynamically stores a program, such as a communication line when a program is transmitted through a network such as the Internet or a communication link such as a telephone circuit, and a medium that stores a program for a certain time, such as a volatile memory in a computer system which is a server or a client in that case. In addition, the aforementioned program may be a program for realizing a part of the above-described functions or a program that can be realized by combining the above-described functions with a program that has already been recorded in a computer system.

Further, the above-described embodiments and modified examples thereof may be implemented as the following modified example.

In the aforementioned embodiments, the calculation switch is switched on and the calculator is operated when a measured value has entered a range in which the measured value is conceived or conceivable as an abnormal value. However, a case in which the calculation switch is switched on need not be limited to a case in which a measured value is in a range in which the measured value is conceivable as an abnormal value, and the calculation switch may be switched on and the calculator may be operated when a measured value has entered any predetermined analysis target range. In addition, when a measured value is out of the analysis target range, the calculation switch is switched off and the calculator is not operated. In this manner, the controller performs control in response to whether a measured value is in an analysis target range.

For example, the following can be performed by using the sound analysis apparatus of the embodiments described so far. For example, in sites where equipment is operated, such as plants and factories, or sites where plants, factories or buildings are constructed, a measured value of a volume level in a normal case is stored. Here, a volume level in a normal case is volume, for example, when an operation sound of a machine or equipment is generated in the aforementioned site. When a predetermined change has occurred with respect to a volume level, the sound analysis apparatus operates the calculator that performs detailed analysis of a sound based on an assumption that there is a possibility of the change being an indication of an abnormality. That is, detailed analysis (as an example, frequency analysis described in the embodiments) of a sound is performed only during a period having a possibility of abnormality. In addition, the calculator is not operated and detailed analysis processing of a sound is not performed in other periods. Accordingly, omission of detailed analysis in an abnormal case is prevented while reducing a power consumption amount. Furthermore, when the sound analysis apparatus is an apparatus of a type of supplying power using a battery (e.g., an apparatus of transmitting data through a wireless signal), power consumption can be minimized and thus a battery exchange interval increases and battery life can be extended.

[Supplementary Note]

[1] To accomplish the aforementioned object, a sound analysis apparatus may include a sound acquirer configured to acquire a sound signal, a measurer configured to output time-series data of numerical values representing volumes based on the sound signal, and a calculator configured to perform calculation for analyzing the time-series data output from the measurer, wherein the calculator performs the calculation in a case of a first state in which a measured value that is the numerical value output from the measurer is included within an analysis target range that is a range in which the measured value is determined to be an analysis target, and wherein the calculator does not perform the calculation in a case of a second state in which the measured value is not included within the analysis target range.

According to this configuration, it is possible to automatically control the calculator such that the calculator operates or does not operate in response to changes of measured values based on analysis target range determination criteria set in advance without manpower.

[2] Further, in one aspect of the present invention, the sound analysis apparatus according to [1], may further include a measured value storage which stores numerical values output from the measurer at a predetermined timing, wherein the calculator determines whether the measured value is included in the analysis target range according to whether a difference obtained by subtracting the numerical value stored in the measured value storage from the measured value or an absolute value of the difference is equal to or greater than a predetermined value.

According to this configuration, the measured value storage stores a measured value of a predetermined timing. In addition, a controller determines whether a latest measured value is included in the analysis target range (abnormality range) and controls whether to operate the calculator based on numerical values stored in the measured value storage.

[3] Further, in the one aspect of the present invention, the sound analysis apparatus according to [1], may further include a threshold value storage which stores a predetermined threshold value, wherein the calculator determines whether the measured value is included in the analysis target range based on the threshold value.

[4] Further, in the one aspect of the present invention, the sound analysis apparatus according to [2], may further include a threshold value storage which stores a predetermined threshold value, wherein the calculator determines whether the measured value is included in the analysis target range based on the threshold value.

According to this configuration, the controller can perform determination based on a predetermined threshold value. In addition, a user and the like can appropriately set a threshold value through an input device.

[5] Further, in one aspect of the present invention, the sound analysis apparatus according to [4], may further include a normal value storage which stores a normal value with respect to the measured value, wherein, the calculator determines the normal value based on the measured value output from the measurer in the past and writes the normal value into the normal value storage, and wherein when the calculator determines whether transition from the first state to the second state occurs, the calculator performs determination based on a relationship between the normal value read from the normal value storage and the measured value.

According to this configuration, it is possible to store a normal value with respect to a measured value. When a calculation switch is on, the controller can determine whether to switch the calculation switch off based on the normal value. It is possible to perform determination based on different criteria through determination of whether to switch the calculation switch from an off state to an on state and determination of whether to switch the calculation switch from an on state to an off state.

[6] Further, in one aspect of the present invention, the sound analysis apparatus according to any one of [1] to [5], may further include an output device which outputs the time-series data output from the measurer and calculation results of the calculator.

According to this configuration, it is possible to perform processing using the time-series data and the calculation results in an external apparatus and the like.

[7] Further, in one aspect of the present invention, the sound analysis apparatus according to [1], may further include a calculation switch which is switched on when the calculator is operated and switched off when the calculator is not operated, and a controller configured to switch on the calculation switch in a case of the first state, and configured to switch off the calculation switch in a case of the second state, wherein the calculator performs the calculation based on an on-state of the calculation switch, and does not perform the calculation based on an off-state of the calculation switch.

According to this configuration, the controller controls whether to operate the calculator depending on a state (the first state or the second state) of a measured value.

[8] Further, a sound analysis method according to one aspect of the present invention may include acquiring a sound signal by a sound acquirer, outputting, by a measurer, time-series data of numerical values representing volumes based on the sound signal, performing, by a calculator, calculation for analyzing the time-series data output from the measurer, performing, by the calculator, the calculation in a case of a first state in which a measured value that is the numerical value output from the measurer is included within an analysis target range that is a range in which the measured value is determined to be an analysis target, and not performing, by the calculator, the calculation in a case of a second state in which the measured value is not included within the analysis target range.

[9] Further, in one aspect of the present invention, the sound analysis method according to [8], may further include storing, into a measured value storage, numerical values output from the measurer at a predetermined timing, and determining, by the calculator, whether the measured value is included in the analysis target range according to whether a difference obtained by subtracting the numerical value stored in the measured value storage from the measured value or an absolute value of the difference is equal to or greater than a predetermined value.

[10] Further, in one aspect of the present invention, the sound analysis method according to [8], may further include storing, into a threshold value storage, a predetermined threshold value, and determining, by the calculator, whether the measured value is included in the analysis target range based on the threshold value.

[11] Further, in one aspect of the present invention, the sound analysis method according to [9], may further include storing, into a threshold value storage, a predetermined threshold value, and determining, by the calculator, whether the measured value is included in the analysis target range based on the threshold value.

[12] Further, in one aspect of the present invention, the sound analysis method according to [11], may further include storing, into a normal value storage, a normal value with respect to the measured value, determining, by the calculator, the normal value based on the measured value output from the measurer in the past, writing, by the calculator, the normal value into the normal value storage, and when the calculator determines whether transition from the first state to the second state occurs, performing, by the calculator, determination based on a relationship between the normal value read from the normal value storage and the measured value.

[13] Further, in one aspect of the present invention, the sound analysis method according to any one of [8] to [12], may further include outputting, by an output device, the time-series data output from the measurer and calculation results of the calculator.

[14] Further, in one aspect of the present invention, the sound analysis method according to [8], may further include switching on, by a controller, a calculation switch in a case of the first state, the calculation switch being switched on when the calculator is operated and switched off when the calculator is not operated, switching off, by the controller, the calculation switch in a case of the second state, performing, by the calculator, the calculation based on an on-state of the calculation switch, and not performing, by the calculator, the calculation based on an off-state of the calculation switch.

[15] Further, a non-transitory computer readable storage medium may store one or more programs configured for execution by a computer of a sound analysis apparatus. The one or more programs may include instructions for acquiring a sound signal by a sound acquirer, outputting, by a measurer, time-series data of numerical values representing volumes based on the sound signal, performing, by a calculator, calculation for analyzing the time-series data output from the measurer, performing, by the calculator, the calculation in a case of a first state in which a measured value that is the numerical value output from the measurer is included within an analysis target range that is a range in which the measured value is determined to be an analysis target, and not performing, by the calculator, the calculation in a case of a second state in which the measured value is not included within the analysis target range.

[16] Further, in one aspect of the present invention, the non-transitory computer readable storage medium according to [15], wherein the one or more programs may further include instructions for storing, into a measured value storage, numerical values output from the measurer at a predetermined timing, and determining, by the calculator, whether the measured value is included in the analysis target range according to whether a difference obtained by subtracting the numerical value stored in the measured value storage from the measured value or an absolute value of the difference is equal to or greater than a predetermined value.

[17] Further, in one aspect of the present invention, the non-transitory computer readable storage medium according to [15], wherein the one or more programs may further include instructions for storing, into a threshold value storage, a predetermined threshold value, and determining, by the calculator, whether the measured value is included in the analysis target range based on the threshold value.

[18] Further, in one aspect of the present invention, the non-transitory computer readable storage medium according to [16], wherein the one or more programs may further include instructions for storing, into a threshold value storage, a predetermined threshold value, and determining, by the calculator, whether the measured value is included in the analysis target range based on the threshold value.

[19] Further, in one aspect of the present invention, the non-transitory computer readable storage medium according to [18], wherein the one or more programs may further include instructions for storing, into a normal value storage, a normal value with respect to the measured value, determining, by the calculator, the normal value based on the measured value output from the measurer in the past, writing, by the calculator, the normal value into the normal value storage, and when the calculator determines whether transition from the first state to the second state occurs, performing, by the calculator, determination based on a relationship between the normal value read from the normal value storage and the measured value.

[20] Further, in one aspect of the present invention, the non-transitory computer readable storage medium according to any one of [15] to [19], wherein the one or more programs may further include instructions for outputting, by an output device, the time-series data output from the measurer and calculation results of the calculator.

[21] Further, a program configured for execution by a computer of a sound analysis apparatus, may include instructions for acquiring a sound signal by a sound acquirer, outputting, by a measurer, time-series data of numerical values representing volumes based on the sound signal, performing, by a calculator, calculation for analyzing the time-series data output from the measurer, performing, by the calculator, the calculation in a case of a first state in which a measured value that is the numerical value output from the measurer is included within an analysis target range that is a range in which the measured value is determined to be an analysis target, and not performing, by the calculator, the calculation in a case of a second state in which the measured value is not included within the analysis target range.

Also according to the above-described program and the non-transitory computer readable storage medium, a technical effect which is the same as that of the sound analysis apparatus can be obtained.

As used herein, the following directional terms "front, back, above, downward, right, left, vertical, horizontal, below, transverse, row and column" as well as any other similar directional terms refer to those instructions of a device equipped with the present invention. Accordingly, these terms, as utilized to describe the present invention should be interpreted relative to a device equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A sound analysis apparatus comprising:
a sound acquirer configured to acquire a sound signal;
a measurer configured to output time-series data of numerical values representing volumes based on the sound signal;
a calculator configured to perform calculation for analyzing the time-series data output from the measurer;
a measured value storage which stores numerical values output from the measurer at a predetermined timing,
a threshold value storage which stores a predetermined threshold value; and
a normal value storage which stores a normal value with respect to the measured value,
wherein the calculator performs the calculation in a case of a first state in which a measured value that is the numerical value output from the measurer is included within an analysis target range that is a range in which the measured value is determined to be an analysis target,
wherein the calculator does not perform the calculation in a case of a second state in which the measured value is not included within the analysis target range,
wherein the calculator determines whether the measured value is included in the analysis target range according to whether a difference obtained by subtracting the numerical value stored in the measured value storage from the measured value or an absolute value of the difference is equal to or greater than a predetermined value, wherein the calculator determines whether the measured value is included in the analysis target range based on the threshold value,
   wherein the calculator determines the normal value based on the measured value output from the measurer in the past and writes the normal value into the normal value storage, and
   wherein when the calculator determines whether transition from the first state to the second state occurs, the calculator performs determination based on a relationship between the normal value read from the normal value storage and the measured value.

2. The sound analysis apparatus according to claim 1, further comprising:
   an output device configured to output the time-series data output from the measurer and calculation results of the calculator.

3. The sound analysis apparatus according to claim 1, further comprising:
   a calculation switch which is switched on when the calculator is operated and switched off when the calculator is not operated, and
   a controller configured to switch on the calculation switch in a case of the first state, and configured to switch off the calculation switch in a case of the second state,
   wherein the calculator performs the calculation based on an on-state of the calculation switch, and does not perform the calculation based on an off-state of the calculation switch.

4. A sound analysis method comprising:
   acquiring a sound signal by a sound acquirer;
   outputting, by a measurer, time-series data of numerical values representing volumes based on the sound signal;
   performing, by a calculator, calculation for analyzing the time-series data output from the measurer;
   storing, into a measured value storage, numerical values output from the measurer at a predetermined timing;
   storing, into a threshold value storage, a predetermined threshold value;
   storing, into a normal value storage, a normal value with respect to the measured value;
   performing, by the calculator, the calculation in a case of a first state in which a measured value that is the numerical value output from the measurer is included within an analysis target range that is a range in which the measured value is determined to be an analysis target;
   not performing, by the calculator, the calculation in a case of a second state in which the measured value is not included within the analysis target range;
   determining, by the calculator, whether the measured value is included in the analysis target range according to whether a difference obtained by subtracting the numerical value stored in the measured value storage from the measured value or an absolute value of the difference is equal to or greater than a predetermined value;
   determining, by the calculator, whether the measured value is included in the analysis target range based on the threshold value;
   determining, by the calculator, the normal value based on the measured value output from the measurer in the past;
   writing, by the calculator, the normal value into the normal value storage; and
   when the calculator determines whether transition from the first state to the second state occurs, performing, by the calculator, determination based on a relationship between the normal value read from the normal value storage and the measured value.

5. The sound analysis method according to claim 4, further comprising:
   outputting, by an output device, the time-series data output from the measurer and calculation results of the calculator.

6. The sound analysis method according to claim 4, further comprising:
   switching on, by a controller, a calculation switch in a case of the first state, the calculation switch being switched on when the calculator is operated and switched off when the calculator is not operated;
   switching off, by the controller, the calculation switch in a case of the second state;
   performing, by the calculator, the calculation based on an on-state of the calculation switch; and
   not performing, by the calculator, the calculation based on an off-state of the calculation switch.

7. A non-transitory computer readable storage medium storing one or more programs configured for execution by a computer of a sound analysis apparatus, the one or more programs comprising instructions for:
   acquiring a sound signal by a sound acquirer;
   outputting, by a measurer, time-series data of numerical values representing volumes based on the sound signal;
   performing, by a calculator, calculation for analyzing the time-series data output from the measurer;
   storing, into a measured value storage, numerical values output from the measurer at a predetermined timing;
   storing, into a threshold value storage, a predetermined threshold value;
   storing, into a normal value storage, a normal value with respect to the measured value;
   performing, by the calculator, the calculation in a case of a first state in which a measured value that is the numerical value output from the measurer is included within an analysis target range that is a range in which the measured value is determined to be an analysis target;
   not performing, by the calculator, the calculation in a case of a second state in which the measured value is not included within the analysis target range;
   determining, by the calculator, whether the measured value is included in the analysis target range according to whether a difference obtained by subtracting the numerical value stored in the measured value storage from the measured value or an absolute value of the difference is equal to or greater than a predetermined value;
   determining, by the calculator, whether the measured value is included in the analysis target range based on the threshold value;
   determining, by the calculator, the normal value based on the measured value output from the measurer in the past;
   writing, by the calculator, the normal value into the normal value storage; and
   when the calculator determines whether transition from the first state to the second state occurs, performing, by the calculator, determination based on a relationship between the normal value read from the normal value storage and the measured value.

8. The non-transitory computer readable storage medium according to claim 7, wherein the one or more programs further comprises instructions for:

outputting, by an output device, the time-series data output from the measurer and calculation results of the calculator.

\* \* \* \* \*